(12) United States Patent
Richter et al.

(10) Patent No.: US 10,509,569 B2
(45) Date of Patent: Dec. 17, 2019

(54) SYSTEM AND METHOD FOR ADAPTIVE COMMAND FETCH AGGREGATION

(71) Applicant: Western Digital Technologies, Inc., San Jose, CA (US)

(72) Inventors: Elkana Richter, Tene (IL); Shay Benisty, Be'er Sheva (IL); Klod Ausslin, Be'er Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 173 days.

(21) Appl. No.: 15/613,795

(22) Filed: Jun. 5, 2017

(65) Prior Publication Data

US 2018/0349026 A1 Dec. 6, 2018

Related U.S. Application Data

(63) Continuation-in-part of application No. 15/468,620, filed on Mar. 24, 2017.

(51) Int. Cl.
| | | |
|---|---|---|
| *G06F 12/00* | (2006.01) | |
| *G06F 3/06* | (2006.01) | |
| *G06F 13/42* | (2006.01) | |

(52) U.S. Cl.
CPC .......... *G06F 3/061* (2013.01); *G06F 3/0659* (2013.01); *G06F 3/0688* (2013.01); *G06F 13/4282* (2013.01); *G06F 2212/7203* (2013.01); *G06F 2212/7208* (2013.01); *G06F 2213/0026* (2013.01)

(58) Field of Classification Search
None
See application file for complete search history.

(56) References Cited

U.S. PATENT DOCUMENTS

| | | |
|---|---|---|
| 6,065,089 A | 5/2000 | Hickerson |
| 6,654,343 B1 | 11/2003 | Brandis |
| 7,386,674 B1 | 6/2008 | Lango |

(Continued)

FOREIGN PATENT DOCUMENTS

EP 2312457 4/2011

OTHER PUBLICATIONS

Janene Ellefson, SSD Product Market Manager—PCIe, Micron Technology, "NVM Express: Unlock Your Solid State Drives Potential", Flash Memory Summit 2013, Santa Clara, CA, 114 pages.

(Continued)

*Primary Examiner* — Daniel D Tsui
(74) *Attorney, Agent, or Firm* — Morgan, Lewis & Bockius LLP

(57) ABSTRACT

Systems and methods for adaptive fetch coalescing are disclosed. NVM Express (NVMe) implements a paired submission queue and completion queue mechanism, with host software on the host device placing commands into the submission queue. The host device notifies the memory device, via a doorbell update, of commands on the submission queue. Instead of fetching the command responsive to the doorbell update, the memory device may analyze one or more aspects in order to determine whether and how to coalesce fetching of the commands. In this way, the memory device may include the intelligence to coalesce fetching in order to more efficiently fetch the commands from the host device.

20 Claims, 12 Drawing Sheets

(56) References Cited

U.S. PATENT DOCUMENTS

| | | |
|---|---|---|
| 8,554,968 B1 | 10/2013 | Onufryk |
| 8,732,406 B1 | 5/2014 | Pase |
| 9,317,204 B2 | 4/2016 | Hahn |
| 9,817,761 B2 | 11/2017 | Ben-Shemesh |
| 9,927,983 B2 | 3/2018 | Benisty |
| 10,095,442 B2 | 10/2018 | Myouga |
| 2003/0204552 A1 | 10/2003 | Zuberi |
| 2004/0199732 A1 | 10/2004 | Kelley |
| 2005/0195635 A1 | 9/2005 | Conley et al. |
| 2006/0161733 A1 | 7/2006 | Beckett et al. |
| 2008/0109573 A1 | 5/2008 | Leonard |
| 2012/0151472 A1 | 6/2012 | Koch et al. |
| 2014/0181323 A1 | 6/2014 | Manula |
| 2014/0189212 A1 | 7/2014 | Slaight |
| 2014/0281040 A1 | 9/2014 | Liu |
| 2015/0019798 A1 | 1/2015 | Huang |
| 2015/0067291 A1 | 3/2015 | Miyamoto |
| 2015/0074338 A1 | 3/2015 | Raviv et al. |
| 2015/0074677 A1 | 3/2015 | Pream |
| 2015/0081933 A1 | 3/2015 | Vucinic et al. |
| 2015/0127882 A1 | 5/2015 | Carlson et al. |
| 2015/0177994 A1 | 6/2015 | Vucinic et al. |
| 2015/0178017 A1 | 6/2015 | Darrington |
| 2015/0186068 A1 | 7/2015 | Benisty |
| 2015/0186074 A1 | 7/2015 | Benisty |
| 2015/0254088 A1 | 9/2015 | Chou et al. |
| 2015/0363229 A1 | 12/2015 | Wang |
| 2016/0004438 A1 | 1/2016 | Moon et al. |
| 2016/0026388 A1 | 1/2016 | Jeong et al. |
| 2016/0062669 A1 | 3/2016 | Chu |
| 2016/0077740 A1 | 3/2016 | Hussain et al. |
| 2016/0085718 A1 | 3/2016 | Huang |
| 2016/0124876 A1 | 5/2016 | Vucinic et al. |
| 2016/0140041 A1 | 5/2016 | Niu et al. |
| 2016/0147442 A1 | 5/2016 | Baderdinni et al. |
| 2016/0162219 A1 | 6/2016 | Erez |
| 2016/0188510 A1 | 6/2016 | Singh et al. |
| 2016/0216905 A1 | 7/2016 | Yazdani et al. |
| 2016/0239939 A1 | 8/2016 | Kakarlapudi |
| 2016/0267016 A1 | 9/2016 | Lee et al. |
| 2016/0291866 A1 | 10/2016 | Olkay |
| 2016/0292007 A1 | 10/2016 | Ding et al. |
| 2016/0321010 A1 | 11/2016 | Hashimoto |
| 2016/0321012 A1 | 11/2016 | Clark et al. |
| 2016/0342545 A1 | 11/2016 | Arai |
| 2017/0010992 A1 | 1/2017 | Sarcone |
| 2017/0060422 A1 | 3/2017 | Sharifie et al. |
| 2017/0060749 A1 | 3/2017 | Segev et al. |
| 2017/0075629 A1 | 3/2017 | Manohar et al. |
| 2017/0075828 A1 | 3/2017 | Monji et al. |
| 2017/0083252 A1 | 3/2017 | Singh et al. |
| 2017/0090753 A1* | 3/2017 | Benisty ............... G06F 3/061 |
| 2017/0109096 A1 | 4/2017 | Jean |
| 2017/0123659 A1 | 5/2017 | Nam et al. |
| 2017/0123667 A1* | 5/2017 | Richter ............... G06F 3/0679 |
| 2017/0131917 A1 | 5/2017 | Yun |
| 2017/0177222 A1 | 6/2017 | Singh et al. |
| 2017/0214762 A1 | 7/2017 | Swain |
| 2017/0286205 A1 | 10/2017 | Jeong et al. |
| 2017/0322897 A1 | 11/2017 | Benisty |
| 2018/0059987 A1 | 3/2018 | Nimmagadda |
| 2018/0095911 A1 | 4/2018 | Ballapuram |
| 2018/0113615 A1 | 4/2018 | Park |
| 2018/0173461 A1 | 6/2018 | Carroll |
| 2018/0217951 A1 | 8/2018 | Benisty |
| 2018/0260152 A1 | 9/2018 | Bar et al. |
| 2018/0275872 A1 | 9/2018 | Benisty |
| 2018/0275921 A1 | 9/2018 | Katagiri |
| 2018/0285073 A1 | 10/2018 | Fukuchi |
| 2018/0314421 A1 | 11/2018 | Linkovsky et al. |
| 2018/0321844 A1 | 11/2018 | Benisty |
| 2018/0321945 A1 | 11/2018 | Benisty |
| 2018/0321987 A1 | 11/2018 | Benisty |
| 2018/0341410 A1 | 11/2018 | Benisty |
| 2019/0018805 A1 | 1/2019 | Benisty |

OTHER PUBLICATIONS

Kevin Marks, Dell, Inc., "An NVM Express Tutorial", Flash Memory Summit 2013, Santa Clara, CA, 92 pages.

Electronic unpublished U.S. Appl. No. 15/148,409 entitled "Systems and Methods for Processing a Submission Queue" filed May 6, 2016, pending, 66 pages.

Specification and Drawings of U.S. Appl. No. 15/457,676 entitled "Storage System and Method for Thermal Throttling via Command Arbitration" filed Mar. 13, 2017; 32 pages.

International Search Report and Written Opinion from PCT/US2018/019905, dated May 4, 2018, 13 pages.

International Search Report and Written Opinion from PCT/US2018/019909, dated Jul. 6, 2018, 18 pages.

International Search Report and Written Opinion from PCT/US2018/019911, dated May 28, 2018, 15 pages.

International Search Report and Written Opinion from PCT/US2018/019914, dated Jul. 13, 2018, 18 pages.

International Search Report and Written Opinion from PCT/US2018/019930, dated Jun. 4, 2018, 16 pages.

International Search Report and Written Opinion from PCT/US2018/019933 dated May 22, 2018, 12 pages.

International Search Report and Written Opinion from PCT/US2018/019941, dated Jul. 13, 2018, 18 pages.

NVMe Express Workgroup: NVM Express 1.2, dated Nov. 3, 2014, retrieved from http://nvmexpress.org/wp-conent/uploads/NVM_Express_1_2_Gold_20141209.pdf, 205 pages.

"NVM Express TM: Unlock the Potential," compilation of several articles from Forum A-11, 2014 Flash Memory Summit, Aug. 2014, Santa Clara, CA, 91 pages.

* cited by examiner

Submission Queue

Tail Pointer
- Host enqueues command
- Host advances Tail pointer
- Host notifies Controller of new Tail Pointer by writing SQ Tail Doorbell register

Head Pointer
- Controller dequeues command
- Controller advances Head Pointer
- Controller notifies Host of new Head Pointer by passing value in Completion

Completion Queue

Tail Pointer
- Controller enqueues completion & inverts Phase Tag
- Controller advances Tail pointer
- Controller notifies Host of new Tail Pointer by signaling an interrupt

Head Pointer
- Host dequeues completion
- Host advances Head Pointer
- Host notifies Controller of new Head Pointer by writing CQ Head Doorbell register

FIG. 3B

SYSTEM AND METHOD FOR ADAPTIVE COMMAND FETCH AGGREGATION

REFERENCE TO RELATED APPLICATION

This is a continuation-in-part application of U.S. patent application Ser. No. 15/468,620, filed on Mar. 24, 2017.

BACKGROUND

NVM Express (NVMe) is a standard for accessing non-volatile storage media attached via PCI Express (PCIe) bus. NVMe may be used with a variety of non-volatile storage media, such as solid state drives (SSDs). One focus of NVMe relates to I/O communication between a host device (which may access and/or write to the non-volatile storage media) and a memory device (which includes the non-volatile storage media). In that regard, NVMe implements a paired submission queue and completion queue mechanism, with host software on the host device placing commands into the submission queue, and then notifying the memory device of the commands placed into the submission queue. Responsive to the notice, the memory device fetches the commands from the submission queue.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

FIG. 3B is an illustration of the submission queue and the completion queue.

DETAILED DESCRIPTION OF EMBODIMENTS

Overview

Figure 1A:
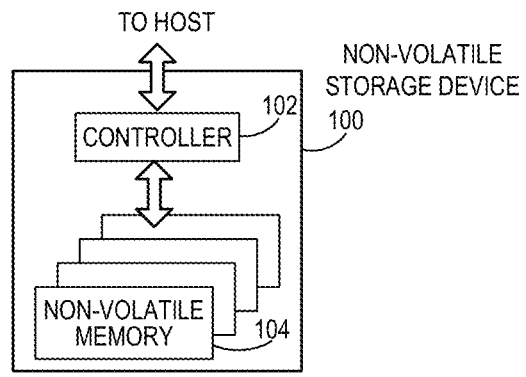
FIG. 1A is a block diagram of an exemplary non-volatile memory system.

As discussed in more detail below, the host device causes commands to be submitted to the submission queue (such as by direct submission for a submission queue resident on the host device or by indirect submission for a submission queue resident on the memory device). Thereafter, the host device notifies the memory device of the commands on the submission queue. In response to being notified, the memory device fetches the commands from the submission queue and processes the commands. In this regard, the host device possesses the intelligence to time when the memory device fetches the command. In particular, the timing by which the memory device fetches the command from the submission queue is directly dependent on the timing of the notification by the host.

In one implementation, the memory device includes intelligence, separate from or in addition to the notice provided by the host device, when to fetch the commands from submission queue. In particular, the memory device may use one or more fetching criteria or one or more fetching thresholds, discussed further below, in order to determine when, responsive to an indication from the host device of commands on the submission queue, to fetch the commands. As discussed below, the fetching criteria or fetching thresholds may be pre-programmed in the memory device and/or may be dynamically determined by the memory device. As one example, the fetching criteria or fetching threshold may be directed to a number of commands for fetching. In particular, responsive to receiving notice from the host device, the memory device may compare a number of commands that are to be fetched with the fetching threshold. If the number of commands to be fetched is greater than the fetching threshold, the memory device fetches the commands from the submission queue(s). If the number of commands to be fetched is less than the fetching threshold, the memory device may wait (such as a predetermined amount of time or wait until the host device sends another notification of commands to fetch) before fetching the commands from the submission queue(s). As another example, the fetching criteria or fetching threshold may be directed to a time. In particular, responsive to receiving notice from the host device, the memory device may calculate a time (such as a time since the memory device last fetched commands from a submission queue or such as a time since the memory device last received notice from the host device of commands to fetch from the submission queue), and compare the calculated time with the fetching threshold. If the calculated time is greater than the fetching threshold, the memory device fetches the commands from the submission queue(s). If the calculated time is less than the fetching threshold, the memory device may wait (such as wait until the fetching threshold time is met or wait until the host device sends another notification of commands to fetch) before fetching the commands from the submission queue(s). As discussed below, the fetching criteria or fetching threshold may be for a single submission queue (e.g., a fetching threshold for submission queue A for determining whether a number of commands to fetch from submission queue A is greater than the fetching threshold), may be for a group of submission queues (e.g., all submission queues classified as an admin submission queue), or may be for all of the submission queues.

In a first specific implementation, the memory device may consider one or more factors dependent on the current state of the host device or the memory device in determining the fetching criteria or fetching thresholds. As one example, the memory device may consider one or more aspects of the submission queue and/or the completion queue (e.g., the number of command current being processed, the number of commands in the completion queue, etc.). As another example, the memory device may consider the state of the communication interface between the memory device and the host device (e.g., a level of busyness for the ingress bus to the memory device). As still another example, the memory device may consider a state of the memory device or of the host device. In particular, the memory device may determine a processing capacity of the memory device (e.g., whether the memory device has excess processing capacity or a dearth of processing capacity). Responsive to this determination, the memory device may determine whether to require a number of commands for fetching be greater than or equal to the fetching threshold before fetching the one or more commands from the submission queue. Thus, in response to determining that the memory device has higher processing capacity, the memory device may determine not to require the number of commands for fetching be greater than or equal to the fetching threshold before fetching the one or more commands from the submission queue. Or, in response to determining that the memory device has lower processing capacity, the memory device may determine to require the number of commands for fetching be greater than or equal to the fetching threshold before fetching the one or more commands from the submission queue. Likewise, the memory device may determine a state of the host device and determine whether to implement the fetching criteria or threshold(s) accordingly. In particular, the memory device may determine the processing capacity of the host device based on a response time of the host device in responding to an interrupt (such as step 6 in FIG. 3A). In this way, the memory device may dynamically determine whether to implement the fetching criteria or threshold(s).

In a second specific implementation, the memory device may consider one or more factors dependent on analysis of a previous state of the host device or the memory device in determining the fetching criteria or fetching thresholds. As one example, the memory device may analyze one or more patterns of previous host device notifications regarding the submission queue, such as the timing between the previous host device notifications, the number of commands typically fetched with previous notifications, etc. In this regard, one of the fetching criteria may be a fetching wait time, as indicated by the timing between the previous host device notifications. For example, the fetching wait time may comprise a time for the memory device to wait after receiving a notification that a command is available to fetch from one or more submission queues.

In a third specific implementation, the memory device may consider one or more factors independent of any analysis of the current or previous state of the host device or the memory device. As one example, the memory device may access one or more predetermined fetch parameters, such as waiting a predetermined amount of time after the host device notification or waiting until a predetermined number of commands is to be fetched from the submission queue. Thus, one of the fetching criteria may comprise a fetching threshold as to the predetermined number of commands to be fetched from the submission queue. In this regard, adding intelligence in the memory device (separate from or in addition to the intelligence on the host device) as to when to fetch the commands may more efficiently implement the process of fetching commands from the submission queue.

Embodiments

The following embodiments describe non-volatile memory devices and related methods for processing of commands. Before turning to these and other embodiments, the following paragraphs provide a discussion of exemplary non-volatile memory devices and storage modules that can be used with these embodiments. Of course, these are just examples, and other suitable types of non-volatile memory devices and/or storage modules can be used.

FIG. 1A is a block diagram illustrating a non-volatile memory device 100. The non-volatile memory device 100 may include a controller 102 and non-volatile memory that may be made up of one or more non-volatile memory dies 104. As used herein, the term die refers to the set of non-volatile memory cells, and associated circuitry for managing the physical operation of those non-volatile memory cells, that are formed on a single semiconductor substrate. The controller 102 may interface with a host device or a host system and transmit command sequences for read, program, and erase operations to the non-volatile memory die(s) 104. As discussed below, the commands may include logical and/or physical addresses.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. One example of the firmware is a flash translation layer. In operation, when a host device needs to read data from or write data to the flash memory, it will communicate with the flash memory controller. In one embodiment, if the host device provides a logical address to which data is to be read/written, the flash memory controller can convert the logical address received from the host to a physical address in the flash memory. The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between the controller 102 and the non-volatile memory die(s) 104 may be any suitable flash interface, such as Toggle Mode 200, 400, or 800. In one embodiment, the memory device 100 may be a card based system, such as a secure digital (SD) or a micro secure digital (micro-SD) card. In an alternate embodiment, the non-volatile memory device 100 may be part of an embedded memory device.

Although in the example illustrated in FIG. 1A, the non-volatile memory device 100 may include a single channel between the controller 102 and the non-volatile memory die(s) 104, the subject matter described herein is not limited to having a single memory channel. For example, in some NAND memory device architectures, 2, 4, 8 or more NAND channels may exist between the controller and the NAND memory die(s) 104, depending on controller capabilities. In any of the embodiments described herein, more than a single channel may exist between the controller and the memory die(s) 104, even if a single channel is shown in the drawings.

Figure 1B:
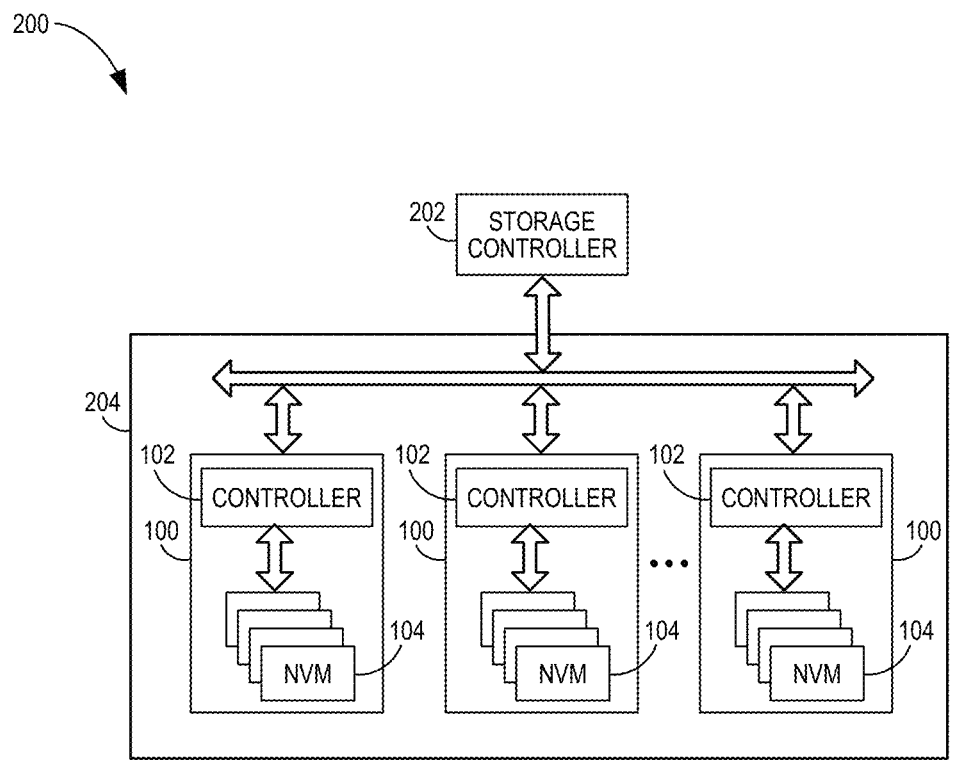
FIG. 1B is a block diagram of a storage module that includes a plurality of non-volatile memory systems and a host.

FIG. 1B illustrates a storage module 200 that includes plural non-volatile memory devices 100. As such, the storage module 200 may include a storage controller 202 that interfaces with a host 220 and with a storage system 204, which includes a plurality of non-volatile memory devices 100. The interface between the storage controller 202 and non-volatile memory devices 100 may be a bus interface, such as a serial advanced technology attachment (SATA), a peripheral component interface express (PCIe) interface, an embedded MultiMediaCard (eMMC) interface, a SD interface, or a Universal Serial Bus (USB) interface, as examples. The storage system 200, in one embodiment, may be a solid state drive (SSD), such as found in portable computing devices, such as laptop computers and tablet computers, and mobile phones.

Figure 1C:
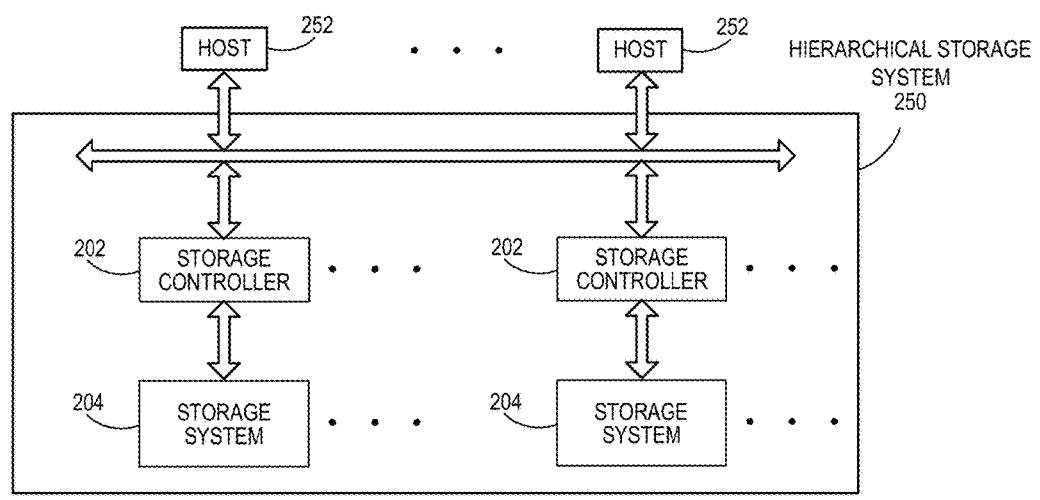
FIG. 1C is a block diagram of a hierarchical storage system.

FIG. 1C is a block diagram illustrating a hierarchical storage system 250. The hierarchical storage system 250 may include a plurality of storage controllers 202, each of which control a respective storage system 204. Host systems 252 may access memories within the hierarchical storage system 250 via a bus interface. Example bus interfaces may include a non-volatile memory express (NVMe), a fiber channel over Ethernet (FCoE) interface, an SD interface, a USB interface, a SATA interface, a PCIe interface, or an eMMC interface as examples. In one embodiment, the hierarchical storage system 250 illustrated in FIG. 1C may be a rack mountable mass storage system that is accessible by multiple host computers, such as would be found in a data center or other location where mass storage is needed. In one embodiment, host systems 252 may include the functionality described in host 220.

Figure 2A:
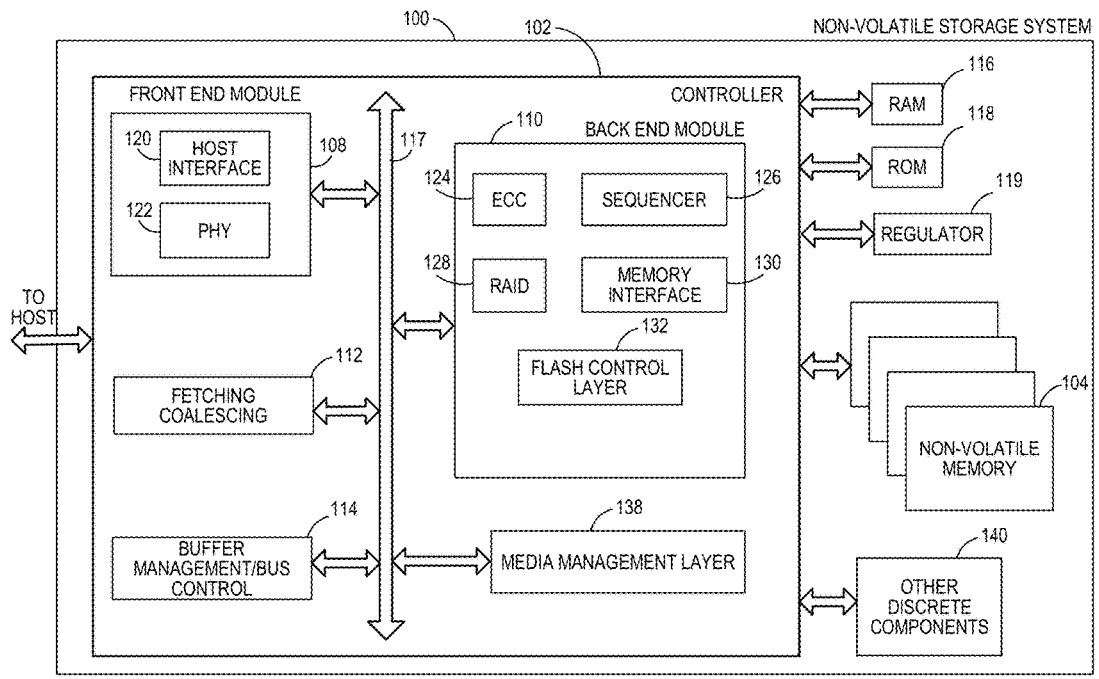
FIG. 2A is a block diagram of exemplary components of a controller of the non-volatile memory system of FIG. 1A.

FIG. 2A is a block diagram illustrating exemplary components of the controller 102 in more detail. The controller 102 may include a front end module 108 that interfaces with a host, a back end module 110 that interfaces with the non-volatile memory die(s) 104, and various other modules that perform various functions of the non-volatile memory device 100. In general, a module may be hardware or a combination of hardware and software. For example, each module may include an application specific integrated circuit (ASIC), a field programmable gate array (FPGA), a circuit, a digital logic circuit, an analog circuit, a combination of discrete circuits, gates, or any other type of hardware or combination thereof. In addition or alternatively, each module may include memory hardware that comprises instructions executable with a processor or processor circuitry to implement one or more of the features of the module. When any one of the module includes the portion of the memory that comprises instructions executable with the processor, the module may or may not include the processor. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 102 may include a buffer manager/bus control module 114 that manages buffers in random access memory (RAM) 116 and controls the internal bus arbitration for communication on an internal communications bus 117 of the controller 102. A read only memory (ROM) 118 may store and/or access system boot code. Although illustrated in FIG. 2A as located separately from the controller 102, in other embodiments one or both of the RAM 116 and the ROM 118 may be located within the controller 102. In yet other embodiments, portions of RAM 116 and ROM 118 may be located both within the controller 102 and outside the controller 102. Further, in some implementations, the controller 102, the RAM 116, and the ROM 118 may be located on separate semiconductor dies. As discussed below, in one implementation, the submission queues and the completion queues may be stored in the Controller Memory Buffer, which may be housed in RAM 116.

Additionally, the front end module 108 may include a host interface 120 and a physical layer interface (PHY) 122 that provide the electrical interface with the host or next level storage controller. The choice of the type of the host interface 120 can depend on the type of memory being used. Examples types of the host interface 120 may include, but are not limited to, SATA, SATA Express, SAS, Fibre Channel, USB, PCIe, and NVMe. The host interface 120 may typically facilitate transfer for data, control signals, and timing signals.

The back end module 110 may include an error correction controller (ECC) engine 124 that encodes the data bytes received from the host, and decodes and error corrects the data bytes read from the non-volatile memory die(s) 104. As discussed in more detail below, the ECC engine may be tunable, such as to generate different amounts of ECC data based on the mode (e.g., generate normal mode ECC data in normal programming mode and generate burst mode ECC data in burst programming mode, with the burst mode ECC data being greater than the normal mode ECC data). The back end module 110 may also include a command sequencer 126 that generates command sequences, such as program, read, and erase command sequences, to be transmitted to the non-volatile memory die(s) 104. Additionally, the back end module 110 may include a RAID (Redundant Array of Independent Drives) module 128 that manages generation of RAID parity and recovery of failed data. The RAID parity may be used as an additional level of integrity protection for the data being written into the non-volatile memory device 100. In some cases, the RAID module 128 may be a part of the ECC engine 124. A memory interface 130 provides the command sequences to the non-volatile memory die(s) 104 and receives status information from the non-volatile memory die(s) 104. Along with the command sequences and status information, data to be programmed into and read from the non-volatile memory die(s) 104 may be communicated through the memory interface 130. In one embodiment, the memory interface 130 may be a double data rate (DDR) interface, such as a Toggle Mode 200, 400, or 800 interface. A flash control layer 132 may control the overall operation of back end module 110.

Thus, the controller 102 may include one or more management tables for managing operations of storage system 100. One type of management table includes logical-to-physical address mapping table. The size of logical-to-physical address mapping table may grow with memory size. In this regard, the logical-to-physical address mapping table for high capacity storage device (e.g., greater than 32G) may be too large to store in SRAM, are may be stored in non-volatile memory 104 along with user and host data. Therefore, accesses to non-volatile memory 104 may first require reading the logical-to-physical address mapping table from non-volatile memory 104.

Additional modules of the non-volatile memory device 100 illustrated in FIG. 2A may include a media management layer 138, which performs wear leveling of memory cells of the non-volatile memory die 104. The non-volatile memory device 100 may also include other discrete components 140, such as external electrical interfaces, external RAM, resistors, capacitors, or other components that may interface with controller 102. In alternative embodiments, one or more of the RAID module 128, media management layer 138 and buffer management/bus controller 114 are optional components that may not be necessary in the controller 102.

Another module of the non-volatile memory device 100 illustrated in FIG. 2A may include fetch coalescing module 112. As discussed in more detail below, the memory device may determine whether to coalesce fetches to the submission queue, with the memory device using the fetching coalescing module 112 to make the determination.

Figure 2B:
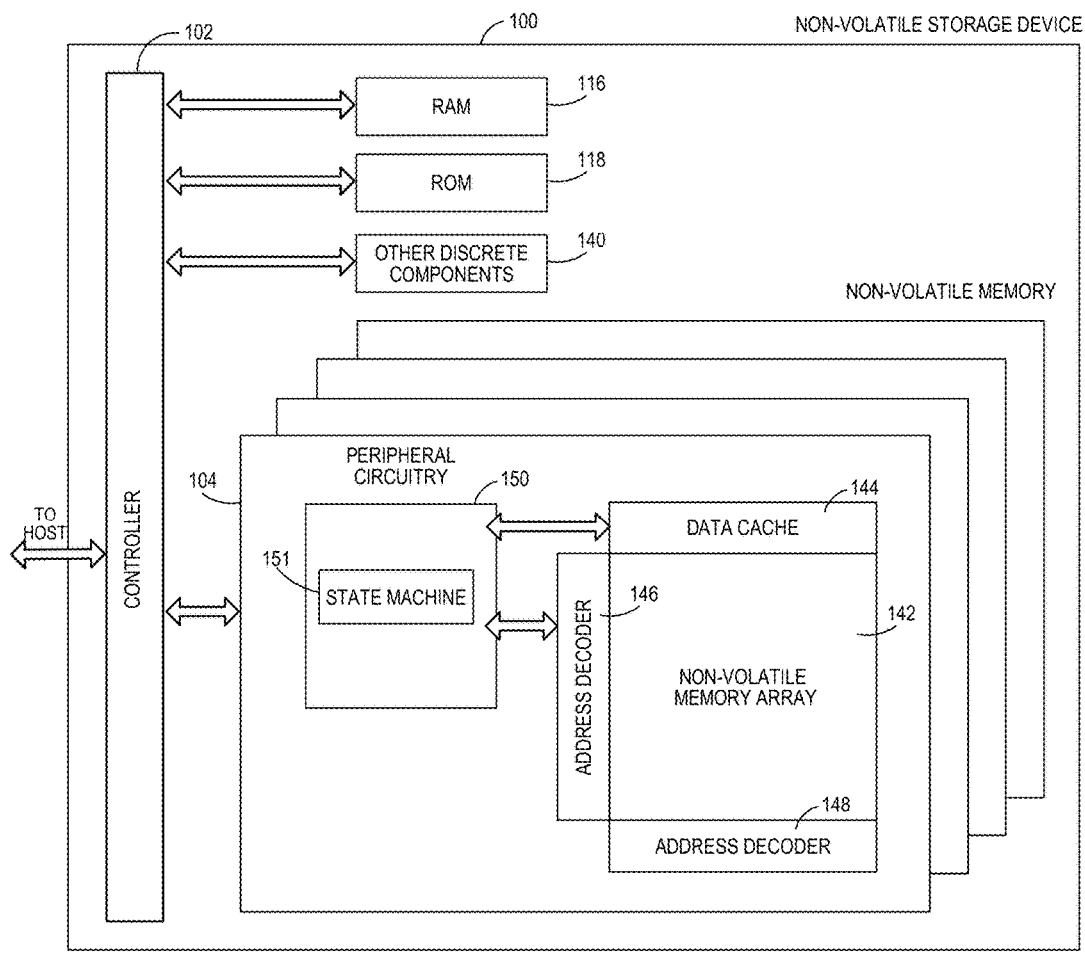
FIG. 2B is a block diagram of exemplary components of a non-volatile memory die of the non-volatile memory system of FIG. 1A.

FIG. 2B is a block diagram illustrating exemplary components of a non-volatile memory die 104 in more detail. The non-volatile memory die 104 may include a non-volatile memory array 142. The non-volatile memory array 142 may include a plurality of non-volatile memory elements or cells, each configured to store one or more bits of data. The non-volatile memory elements or cells may be any suitable non-volatile memory cells, including NAND flash memory cells and/or NOR flash memory cells in a two dimensional and/or three dimensional configuration. The memory cells may take the form of solid-state (e.g., flash) memory cells and can be one-time programmable, few-time programmable, or many-time programmable. In addition, the memory elements or cells may be configured as single-level cells (SLCs) that store a single bit of data per cell, multi-level cells (MLCs) that store multiple bits of data per cell, or combinations thereof. For some example configurations, the multi-level cells (MLCs) may include triple-level cells (TLCs) that store three bits of data per cell.

Additionally, a flash memory cell may include in the array 142 a floating gate transistor (FGT) that has a floating gate and a control gate. The floating gate is surrounded by an insulator or insulating material that helps retain charge in the floating gate. The presence or absence of charges inside the floating gate may cause a shift in a threshold voltage of the FGT, which is used to distinguish logic levels. That is, each FGT's threshold voltage may be indicative of the data stored in the memory cell. Hereafter, FGT, memory element and memory cell may be used interchangeably to refer to the same physical entity.

The memory cells may be disposed in the memory array 142 in accordance with a matrix-like structure of rows and columns of memory cells. At the intersection of a row and a column is a FGT (or memory cell). A column of FGTs may be referred to as a string. FGTs in a string or column may be electrically connected in series. A row of FGTs may be referred to as a page. Control gates of FGTs in a page or row may be electrically connected together.

The memory array 142 may also include wordlines and bitlines connected to the FGTs. Each page of FGTs is coupled to a wordline. In particular, each wordline may be coupled to the control gates of FGTs in a page. In addition, each string of FGTs may be coupled to a bitline. Further, a single string may span across multiple wordlines, and the number of FGTs in a string may be equal to the number of pages in a block.

The non-volatile memory die 104 may further include a page buffer or data cache 144 that caches data that is sensed from and/or that is to be programmed to the memory array 142. The non-volatile memory die 104 may also include a row address decoder 146 and a column address decoder 148. The row address decoder 146 may decode a row address and select a particular wordline in the memory array 142 when reading or writing data to/from the memory cells in the memory array 142. The column address decoder 148 may decode a column address to select a particular group of bitlines in the memory array 142 to be electrically coupled to the data cache 144.

In addition, the non-volatile memory die 104 may include peripheral circuitry 150. The peripheral circuitry 150 may include a state machine 151 that provides status information to the controller 102. Other functionality of the state machine 151 is described in further detail below.

Figure 3A:
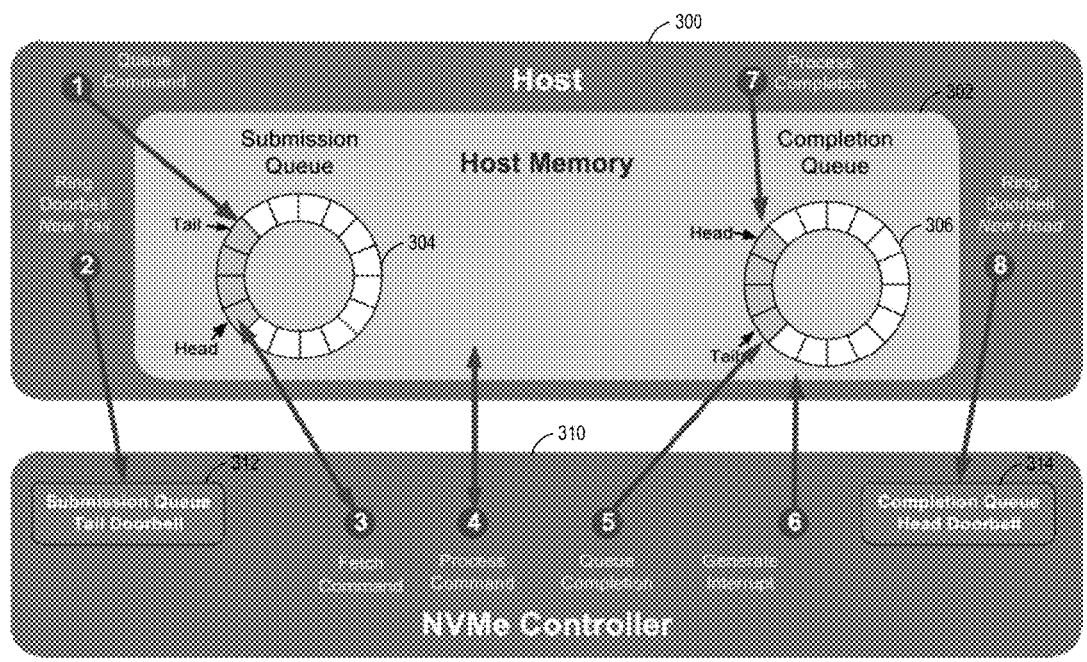
FIG. 3A is a block diagram of the host device and NVMe controller illustrating a sequence for a host device and a memory device to request and process an NVMe command.

FIG. 3A illustrates a sequence of steps for executing a command via the NVMe standard. The NVM standard discloses a scalable host controller interface designed to address the needs of Enterprise and Client systems that utilize PCI Express-based solid state drives. Such systems are based on a paired submission queue and completion queue mechanism.

As shown, the host device 300 includes host memory 302, and the memory device includes a controller, such as an NVMe controller 310. In one implementation, the host memory 302 includes a submission queue 304 and a completion queue 306. Alternatively, the submission queue and completion queue are resident in the memory device, such as in a controller memory buffer. Further, in one implementation, the submission queues and completion queues may have a 1:1 correlation. Alternatively, the submission queues and completion queues do not have a 1:1 correlation.

In practice, at the initialization phase, the host device 300 creates one or more submission queues and one or more corresponding completion queues. In particular, the host device 300 may notify the memory device of the submission queue(s) and completion queue(s) by sending information, such as the base address for each queue to the memory device. In that regard, each submission queue has a corresponding completion queue. When the submission queue and the completion queue are resident in the host device, the host device sends information to the memory device in order for the memory device to determine the locations of the submission queue and the completion queue in the host device. In a specific implementation, the host device sends a command indicating the creation of the submission queue and the completion queue. The command may include a PRP1 pointer, which is a pointer to a list on the host device of the locations of the specific submission queue or the specific completion queue. In practice, the memory device sends a TLP read request using the PRP1 in order to obtain the PRP list, and stores the PRP list in the memory device to determine the memory locations within the host device for use in future commands to read from the specific submission queue or write to the specific completion queue. Alternatively, the host device 300 may instruct the memory device to create the submission queue(s) and corresponding completion queue(s) in a memory resident in the memory device, such as a controller memory buffer.

The submission queue 304 and completion queue 306 may be based on a ring buffer, with a head pointer and a tail pointer. In one implementation, the submission queue and completion queue are circular buffers with fixed slot sizes, such as 64 Bytes for submission queues and 16 Bytes for completion queues. For example, a host device may have up to 64K outstanding commands to a submission queue.

After creating the submission queue(s) and notifying the memory device about the created submission queue(s), the host device 300 may write a command (or several commands) to the submission queue. This is indicated in FIG. 3A as step 1, labeled "Queue Command". In particular, FIG. 3A illustrates that four commands were written to the submission queue. In one implementation, the memory device is unaware that the host device 300 has updated the submission queue 304 with four commands, since the host device 300 updated its own host memory 302. In another implementation (such as when the submission queue(s) and completion queue(s) are resident in the controller memory buffer, the memory device may monitor a communication interface between the host device 300 and the memory device for particular communications, such as writing to the submission queue(s) resident on the memory device. For example, the memory device can monitor the transport layer packets (TLPs) on the PCI Express bus, to determine whether the host device 300 has sent a TLP that results in an update to the submission queue resident in the controller memory buffer. In that regard, the memory device may identify one or more entries being written to the submission queue(s).

In step 2, the host device 300 writes to a submission queue tail doorbell register 312 in the memory device. This writing to the submission queue tail doorbell register 312 signifies to the memory device that the host queue one or more commands in this specific submission queue 304 (e.g., 4 commands as illustrated in FIG. 3A). In particular, the writing to the submission queue tail doorbell register 312 is one form of notice by the host device to the memory device that the host device caused one or more commands to be placed in the submission queue. As discussed in more detail below, this notice by the host device may trigger an analysis by the memory device whether to aggregate fetching of the commands.

The writing to the submission queue tail doorbell register 312 may take one of several forms. In one way, the host device 300 indicates a new tail for the submission queue 304, thereby indicating the number of commands written to the submission queue 304. Thus, since the memory device is aware of the base address for the submission queue 304, the memory device only needs to know the tail address to indicate the number of new commands written to the submission queue 304. As discussed in more detail below, the memory device may consider, as one factor, the number of new commands for fetching in determining whether to aggregate fetching of the commands.

After a command (or a set of commands) is processed, the memory device then sets the new head of the submission queue 304 accordingly. So that, the tail pointer may represent an "offset" from the head pointer. In another way, the host device 300 indicates a number of commands written to the submission queue 304. In practice, each submission queue 304 has a corresponding submission queue tail doorbell register in the memory device, so that when the host device 300 updates a particular doorbell register (correlated to a particular submission queue 304), the memory device can determine, based on the doorbell register, which particular submission queue 304 has been updated.

After step 2 (whereby the memory device is notified of command(s) on the submission queue 304) and before step 3 (whereby the memory device fetches the command(s), the memory device is aware that there are command(s) pending in the submission queue 304. In the general case, there may be several submission queues (with potentially many pending commands in the several submission queues). Thus, before performing step 3, the memory device controller may arbitrate between the various submission queues to select the particular submission queue from which to fetch the command(s). In this regard, the memory device may consider the number of new commands for fetching from a single submission queue, the number of new commands for fetching from multiple submission queues, or the number of new commands for fetching from all available submission queues in determining whether to coalesce the fetching of the commands from the submission queue(s). In this regard, the memory device may consider a single submission queue, alone, in deciding whether to fetch commands from that single submission queue. Alternatively, the memory device may consider multiple submission queues, in combination, in deciding whether to fetch commands from the multiple submission queues.

Responsive to determining which particular submission queue 304 from which to fetch the command(s), at step 3, the memory device fetches the command(s) from the particular submission queue 304. In practice, the memory device may access the base address of the particular submission queue 304 plus the pointer on the current head pointer implemented in the host device 300.

As discussed above, the submission queue or completion queue may be assigned an area of memory (such as in the host device or in the controller memory buffer in the memory device). The submission queue and completion queues may include multiple entries, each associated with a specific command. The size of each entry may be a predetermined size, such as 64 Kb. In this regard, entries within the submission queue may be determined using the base address for the submission queue, and by offsetting the base address with the number of entries multiplied by the size of each entry (e.g., 64 Kb).

As discussed above, the memory device is aware of the tail pointer, having been notified via step 2. Thus, the memory device can obtain all of the new commands from the submission queue 304. In NVMe, the memory device may send a TLP request to obtain the command(s) from the submission queue 304. Responsive to receipt of the TLP request, the host device 300 sends a completion TLP message with the commands in the submission queue 304. In this regard, at end of step 3, the memory device receives the command(s) from the submission queue 304.

At step 4, the memory device processes the command. In one implementation, the memory device parses the commands, and determines the steps to execute the commands (e.g., read/write/etc.). For example, the command may comprise a read command. Responsive to receipt of the read command, the memory device parses the read command, implements the address translation, and accesses the flash to receive the data. After receiving the data, the memory device causes the data to be stored on the host device based on information in the command (e.g., the PRP 1 discussed below). As another example, the command may comprise a write command. Responsive to receipt of the write command, the memory device parses the write command, determines the location of the data on the host device subject to the write, reads the data from the location on the host device, and writes the data to flash memory.

In particular, the memory device may receive a read command or write command with a PRP1 pointer. For example, a read command, in which the host device requests the memory device to read from the flash memory, includes a PRP1 pointer, which points to a PRP list. The memory device obtains the PRP list in order to determine the memory locations within the host device to write the data that was read from the flash memory. As another example, a write command, in which the host device requests the memory device to write data to the flash memory, includes a PRP1 pointer, which points to a PRP list. The memory device obtains the PRP list in order to determine the memory locations within the host device to read the data from (and thereafter save the read data to the flash memory).

Each entry in the PRP list may be associated with a certain section in the host device memory, and may be a predetermined size, such as 4 Kb. Thus, in a 1 Mb transfer, there may be 250 references in the PRP list, each 4 Kb in size. In practice, the memory device may retrieve data out of sequence. This may be due to the data subject to retrieval being on several flash dies, with the dies being available for data retrieval at different times. For example, the memory device may retrieve the data corresponding to 100-200 Kb of the 1 Mb transfer before retrieving the data corresponding to 0-100 Kb of the 1 Mb transfer. Nevertheless, because the memory device has the PRP list (and therefore knows the memory locations the host device expects the data corresponding to 100-200 Kb to be stored), the memory device may transfer the data corresponding to 100-200 Kb of the 1 Mb transfer without having first retrieved the data corresponding to 0-100 Kb of the 1 Mb transfer.

In NVMe, there may be a multitude of PCI Express TLPs to transfer the data from the memory device to the host device 300. Typically, the transferred data is stored in the host memory 302 of the host device 300 based on an indication in the command (e.g., the command includes an address to store the requested data.

After completing the data transfer, at step 5, the memory device controller sends a completion message to the relevant completion queue 306. As mentioned above, at the initialization phase, the host device 300 associates submission queues with completion queues. So that, the host device 300 is aware of commands that are completed in the submission queue based on which completion queue the memory device writes to. The completion message may contain information as to the processing of the command(s), such as whether the command was completed successfully or whether there was an error when executing the command.

After step 5, the host device 300 is unaware that the memory device posted to the completion queue 306. This is due to the memory device causing data to be written to the completion queue 306. In that regard, at step 6, the memory device notifies the host device 300 that there has been an update to the completion queue 306. In particular, the memory device posts an interrupt to the host device 300 (e.g., in NVMe, the host device 300 may use an MSIe interrupt). As discussed in more detail below, the memory device may coalesce the interrupts based on one or more factors.

Responsive to receiving the interrupt, the host device 300 determines that there are one or more completion entries pending for the host device 300 in this completion queue 306. At step 7, the host device 300 then processes the entries in the completion queue 306.

After the host processes the entries from the completion queue 306, at step 8, the host device 300 notifies the memory device of the entries that the host device 300 processed from the completion queue 306. This may be performed by updating a completion queue head doorbell register 314 indicative to the memory device that the host device 300 processed one or more entries from the completion queue 306.

Responsive to updating the completion queue head doorbell register 314, the memory device updates the head of the completion queue 306. Given the new head, the memory device is aware as to which entries in the completion queue 306 have already been processed by the host device 300 and may be overwritten.

FIG. 3B is an illustration of the submission queue and the completion queue, with respective head and tail pointers. The head pointer and the tail pointer associated with each NVMe submission queue and completion queue may be maintained internally in the memory device. In practice, the head pointer may identify the next request to be read from the respective queue. The tail pointer may identify where to submit the next open request. These pointers in the memory device may be termed doorbell registers, as discussed above. The submitter may increment the tail pointer after submitting a new entry to the identified open entry. If the incremented tail pointer exceeds the queue size, the tail pointer may roll to zero.

For example, on the submission queue, the host device may enqueue a command, advance the tail pointer, and notify the controller of the memory device of the new tail pointer by writing to the submission queue tail doorbell register. Further, on the submission queue, the controller on the memory device may dequeue a command from the submission queue (such as by fetching the command), advance the head pointer, and notify the host device of a new head pointer, as shown in FIG. 3B. Conversely, on the completion queue, the controller of the memory device may enqueue a completion entry (and invert the phase tag as an indication to the host device), advance the tail pointer, and notify the host device of the new tail pointer by sending an interrupt (step 6 in FIG. 3A). Further, on the completion queue, the host device may dequeue the completion entry from the completion queue, advance the head pointer, and notify the host device of a new head pointer by writing to the completion queue head doorbell register, as shown in FIG. 3B. The submitter may continue to post entries to the queue as long as the full queue condition is not met.

Consumption of entries from a queue may be performed either by the memory device (such as when fetching new entries from a submission queue, discussed below), or by the host software (such as when reading completion entries from a completion queue, discussed below). The consumer of the entries on a queue may use the current head pointer to identify the next entry that is to be fetched from the queue. In particular, the consumer may increment the head pointer after retrieving the next entry from the queue. If the incremented head pointer exceeds the queue size, the head pointer may roll to zero. The consumer may continue to remove entries from the queue as long as the empty queue condition is not met.

In NVMe-based devices, the memory device may be considered the master on the PCIe bus. The DEVICE-HOST communication may be scheduled though the queue management system. For example, communication may be performed by scheduling the command transfer between the host device and the memory device through the use of the doorbell registers. The host device may signal the memory device of new commands by writing a new number to a doorbell register in the memory device (see step 2 of FIG. 3A). The memory device may calculate from that value the amount of commands that need to be fetched. Thereafter, the memory device may send a command read request to the host device (with the amount of wanted commands), and only then the host device would send to the memory device the command information.

In PCIe buses, the data is sent though packets. The size of the data sent in each packet is set by the memory device, while the maximum size is set by the host device. Due to each packet potentially containing a lot more than only the data, one efficient way to use the PCIe bus by the memory device is to send as much as data as possible in each packet.

In certain operating systems (or alternately in certain system benchmarks), the host device signals the memory device of only one new command at a time, as opposed to aggregating the doorbell write to be multiple commands at once. This results in increased activity on the PCIe bus due to the fact that the bus is not sending the maximum data size that is possible, and more power consumption and lower performance of the system. In this regard, the memory device may use the command fetch aggregation 434 (discussed below) as additional aggregation intelligence on the memory device not present (or not used) on the host device.

Figure 4:
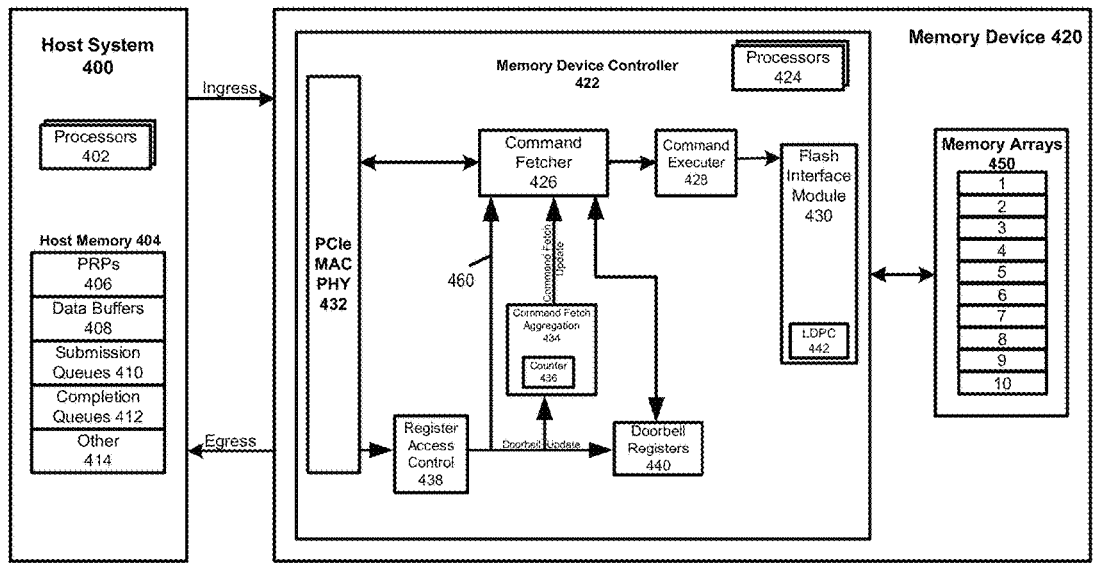
FIG. 4 is a block diagram of other exemplary components of a host system and a memory device.

FIG. 4 is a block diagram of other exemplary components of a host system 400 and a memory device 420. The host system 400 includes one or more processors 402 and host memory 404. Host memory 404 may comprise Physical Region Pages (PRPs) 406, data buffers 408, one or more submission queues 410, one or more completion queues 412, and other memory 414.

FIG. 4 further illustrates a communication interface between the host device 400 and the memory device 420. In a first implementation (not illustrated in FIG. 4), the communication interface between the host device and the memory device is simplex, with communications to and communications from the memory device on the same path. In a second implementation (illustrated in FIG. 4), the communication interface between the host device 400 and the memory device 420 is duplex, with a separate ingress path and a separate egress path. The ingress path, from the perspective of the memory device 420, includes incoming requests from the host device 400 to the memory device 420. Conversely, the egress path, from the perspective of the memory device 420, includes outgoing requests from the memory device 420 to the host device 400.

The incoming requests (requests from the host device 400 to the memory device 420) may be segmented in different ways, such as incoming read requests and incoming write requests. For example, the host device 400 may send, via the ingress path, a read request to read a section of memory in the memory device 420 or a write request to write to a section of memory in the memory device 420. Likewise, the memory device 420 may send, via the egress path, a read request to a section of memory in the host device 400 or a write request to write to a section of memory in the host device 400.

In practice using NVMe, there may be a series of read requests (a request by the host device to read data resident on the memory device, and vice-versa) and a series of write requests (a request by the host device to write data to a location resident on the memory device, and vice-versa). In particular, in NVMe, the memory device and the host device communicate with one another using transaction layer packet (TLP) requests, such as TLP read requests to perform a read on the other device, or TLP write requests to perform a write to the other device. In one example (with the submission queue and the completion queue resident on the host device), responsive to a TLP write request (sent via the ingress path) by the host device to the doorbell register on the memory device (with the write to the doorbell register indicating that there is a command on the submission queue), the memory device uses a TLP read request (sent via the egress path) to fetch the write command from the submission queue (which is resident on the host device). Thus, the write command is a request for the memory device to write data to the non-volatile memory. The memory device then parses the write command for information, such as an indication of a PRP pointer (e.g., PRP1) to a PRP list. The PRP list is a series of information, such as pointers or addresses, that indicates the location of the data in the host device. The memory device then uses another TLP read request to read data from the pointers or address in the PRP list. Thereafter, the memory device performs the write by storing the data in non-volatile memory (e.g., flash memory) on the memory device. After storing the data, the memory device uses a TLP write request to write an entry to the completion queue (indicating that the write command has been completed). Finally, the memory device uses a TLP write request to generate an interrupt to the host device, with the interrupt signaling to the host device that there is an entry on the completion queue. Responsive to the interrupt, the host device reads the entry on the completion queue, and then issues a TLP write request to CQ Doorbell Write register indicating that the host device has reviewed the entry on the completion queue.

As another example (again with the submission queue and the completion queue resident on the host device), responsive to a TLP write request by the host to the doorbell register on the memory device (with the write to the doorbell register indicating that there is a command on the submission queue), the memory device uses a TLP read request to fetch the read command from the submission queue (which is resident on the host device). Thus, the read command is a request for the memory device to read data from the non-volatile memory and to send the read data to the host device. The memory device then reads the non-volatile memory (e.g., flash memory) to read the data. The memory device can perform a series of operations on the data, such as error correction, encryption/decryption, etc., with storage buffers interspersed between each of the serial operation. The memory device may then parse the read command for information, such as an indication of a PRP pointer (e.g., PRP1) to a PRP list. The PRP list is a series of information, such as pointers or addresses, that indicates the location in the host device to store the data that was read from non-volatile memory (and optionally error corrected, encrypted, etc.). The memory device uses a TLP read request to read data from the pointers or address in the PRP list. Thereafter, the memory device uses a TLP write request to write the data that was read from non-volatile memory. After writing the data to the host device, the memory device uses a TLP write request to write an entry to the completion queue (indicating that the read command has been completed). Finally, the memory device uses a TLP write request to generate an interrupt to the host device, with the interrupt signaling to the host device that there is an entry on the completion queue. Responsive to the interrupt, the host device reads the entry on the completion queue, and then issues a TLP write request to CQ Doorbell Write register indicating that the host device has reviewed the entry on the completion queue.

Memory device 420 includes the memory device controller 422 and memory arrays 450. Memory arrays 450 may be segmented in various ways, such as in 10 sections as illustrated in FIG. 4. The memory device controller 422 may include one or more processors 424, and incorporate one or all of a PCIe MAC and PHY interface 432. Flash interface module 430 is configured to control and access the memory arrays 450. In FIG. 4, Flash interface module 430 also includes the low-density parity-check (LDPC) 442 which is a linear error correcting code. Other methods for error correction are contemplated.

Command fetcher 426 is configured to fetch the commands from the submission queues 410 on the host system 400 and queue them internally to the memory device 420. Command executer 428 is configured to arbitrate and execute the commands that were fetched from the submission queues 410.

In one implementation, the command fetcher directly receives the doorbell update from register access control 438 (illustrated as line 460). Through this, the command fetcher 426 immediately fetches the command upon notice from host device 400.

In an alternate implementation, the doorbell update is sent to command fetch aggregation 434 as well as doorbell registers 440. The command fetch aggregation 434 is configured to aggregate the fetch of commands until one or more criteria are met. The criteria may comprise one or more aspects of the system, one or more aspects of the commands, or the like, as discussed above. The memory device may determine the one or more criteria based on analysis of patterns associated with host device notifications regarding the submission queue. As one example, the criterion may comprise a number of commands received, as discussed in more detail below. As another example, the criterion may comprise a timing aspect (e.g., waiting a predetermined amount of time). As still another example, the criterion may comprise a system aspect (e.g., an indication of busyness of the bus; or a status of the particular submission queue (e.g., a number of commands to fetch from the particular submission queue); the number of outstanding host command requests (e.g., the queue depth)). As discussed in more detail below, the command fetch aggregation 434 may use a static value for the criterion (e.g., a predetermined non-changing value). Alternatively, the command fetch aggregation 434 may analyze the system to dynamically select the value for the criterion (e.g., iteratively choose different criteria and analyze the system response to determine an optimal or improved criterion).

In one implementation, the one or more criteria may be for fetching across all submission queues. As discussed above, the host device 400 may have multiple submission queues. In this regard, the criterion may be analyzed across all of the submission queues. For example, with regard to timing, the command fetch aggregation 434 may receive a doorbell update from a first submission queue, and wait a predetermined amount of time before fetching available commands from all of the submission queues. Alternatively, the one or more criteria may be for fetching from a single specific submission queue. For example, with regard to timing, the command fetch aggregation 434 may receive a doorbell update from a first submission queue, and wait a predetermined amount of time before fetching available commands only from the first submission queue. In yet another implementation, the one or more criteria may be for fetching from some, but not all, of the submission queues. The submission queues may be grouped in one of several ways, such as based on type of submission queue, priority of submission queue, or the like. Priority with regard to submission queues is discussed in US Application No. 15/585, 717, incorporated by reference herein in its entirety. For example, the command fetch aggregation 434 may receive a doorbell update from a first submission queue, and may wait a predetermined amount of time before fetching available commands from submission queues with a same priority. As another example, the command fetch aggregation 434 may assign a predetermined number (e.g., a predetermined amount of time or a predetermined number of commands to fetch) to respective submission queues based on the priority of the respective submission queue. In a first particular example, a higher priority queue may have a lower predetermined number assigned thereto (e.g., a smaller predetermined amount of time to wait before deciding to fetch or a smaller threshold of the number of commands in the queue before deciding to fetch). Further, a lower priority queue may have a higher predetermined number assigned thereto (e.g., a higher predetermined amount of time to wait before deciding to fetch or a higher threshold of the number of commands in the queue before deciding to fetch). In a second particular example, a lower priority queue may have a lower predetermined number assigned thereto (e.g., a smaller predetermined amount of time to wait before deciding to fetch or a smaller threshold of the number of commands in the queue before deciding to fetch).

In a first specific implementation, the command fetch aggregation 434 aggregates the command fetch request in the memory device 420 until the number of commands for fetching have passed a certain threshold. When the number of commands for fetching has passed the certain threshold, the command fetch aggregation 434 may send a command to command fetcher 426 to fetch the commands. In that regard, counter 436 may be used to count the number of commands (or to count elapsed time), so that the command fetch aggregation 434 may compare the counted number of commands (the counted elapsed time) to the certain threshold. In one implementation, the threshold is fixed, as discussed above. In an alternative implementation, the threshold is dynamic based on one, any combination, or all of the following aspects: the busyness of the bus (e.g., the overload of the bus); the timing between the doorbell ringing; the amount of commands requested in each doorbell ring; and the number outstanding host requests. For example, the command fetch aggregation 434 may select an initial threshold, analyze one or more aspects of the system (such as the busyness of the ingress and/or egress bus), and select an updated threshold. In this regard, the command fetch aggregation 434 may comprise an intelligent feedback analysis mechanism.

In a second specific implementation, the command fetch aggregation 434 aggregates the command fetch request in the memory device 420 based on timing. The command fetch aggregation 434 may use a clock (not shown in FIG. 4). For example, the command fetch aggregation 434 may receive a doorbell update, and wait a predetermined amount of time until commanding the command fetcher 426 to fetch the commands. The wait time may be predetermined and static, or may be selected based on dynamic analysis (e.g., based on an iterative analysis, such as discussed above).

In a third specific implementation, the command fetch aggregation 434 aggregates the command fetch request in the memory device 420 based on a system aspect. As one example, responsive to receiving the doorbell update, the command fetch aggregation 434 may determine whether the system aspect is present (e.g., an indication of a predetermined busyness of the bus; etc.). If the command fetch aggregation 434 determines that the system aspect is not present, the command fetch aggregation 434 may wait until the system aspect is present. Alternatively, the command fetch aggregation 434 may wait for a predetermined amount of time until the system aspect is present. If the system aspect is not present, the command fetch aggregation 434 may then instruct the command fetcher 426 to fetch the commands.

Figure 5:
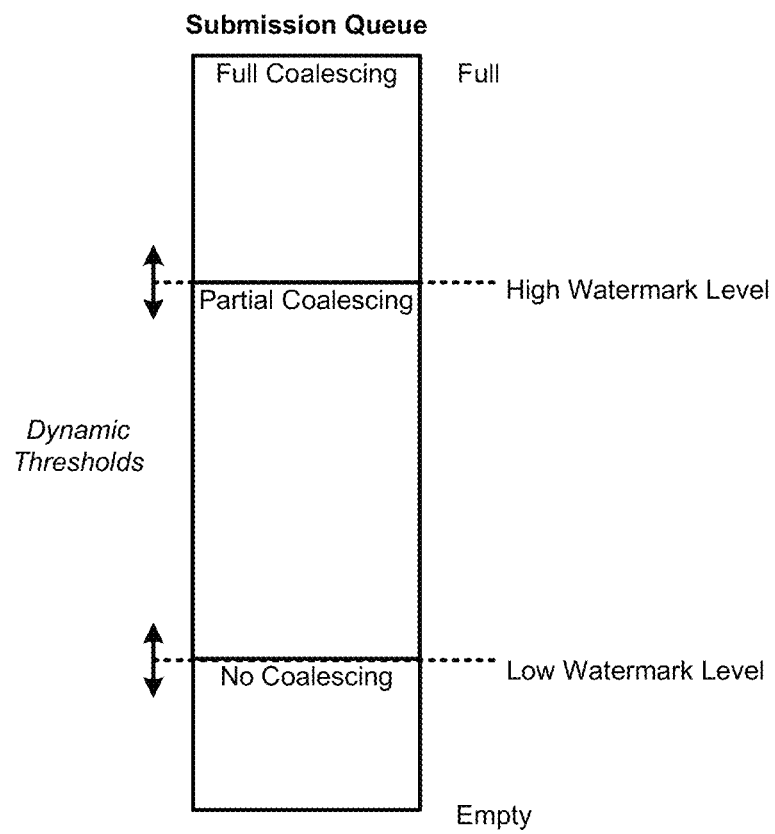
FIG. 5 is a block diagram illustrating the submission queue and fetch coalescing.

FIG. 5 is a block diagram illustrating the submission queue and fetch coalescing. In particular, FIG. 5 illustrates the relation between a submission queue and the fetch coalescing algorithm. In one implementation, for each submission queue, one or more watermark levels may be defined. A watermark level may comprise a number of commands in a particular phase or processing, such as a number of commands that are available for fetching. As discussed above, the memory device may fetch an available command immediately upon notification by the host device of the available command on the submission queue. In one implementation, illustrated in FIG. 5, two watermark levels are defined as being different levels of fullness of the submission queue. The low watermark level may represent the almost empty condition (indicative that the memory device controller 422 has additional capacity) while the high watermark level represents the almost full condition (indicative that the memory device controller 422 may be at or over capacity). In this regard, the low watermark level has a number that is less than the high watermark level. Though two watermark levels are illustrated, one watermark level or three or more watermark levels are contemplated.

One or more of the watermark levels (such as one or both of the high watermark level and the low watermark level illustrated in FIG. 5) may be dynamically adapted or changed based on one or more aspects of the system. As discussed above, various aspects of the system include, but are not limited to, the busyness of the bus, the queue depth, etc. In this regard, the memory device may analyze these aspects in dynamically determining the watermark level(s).

Figure 6:
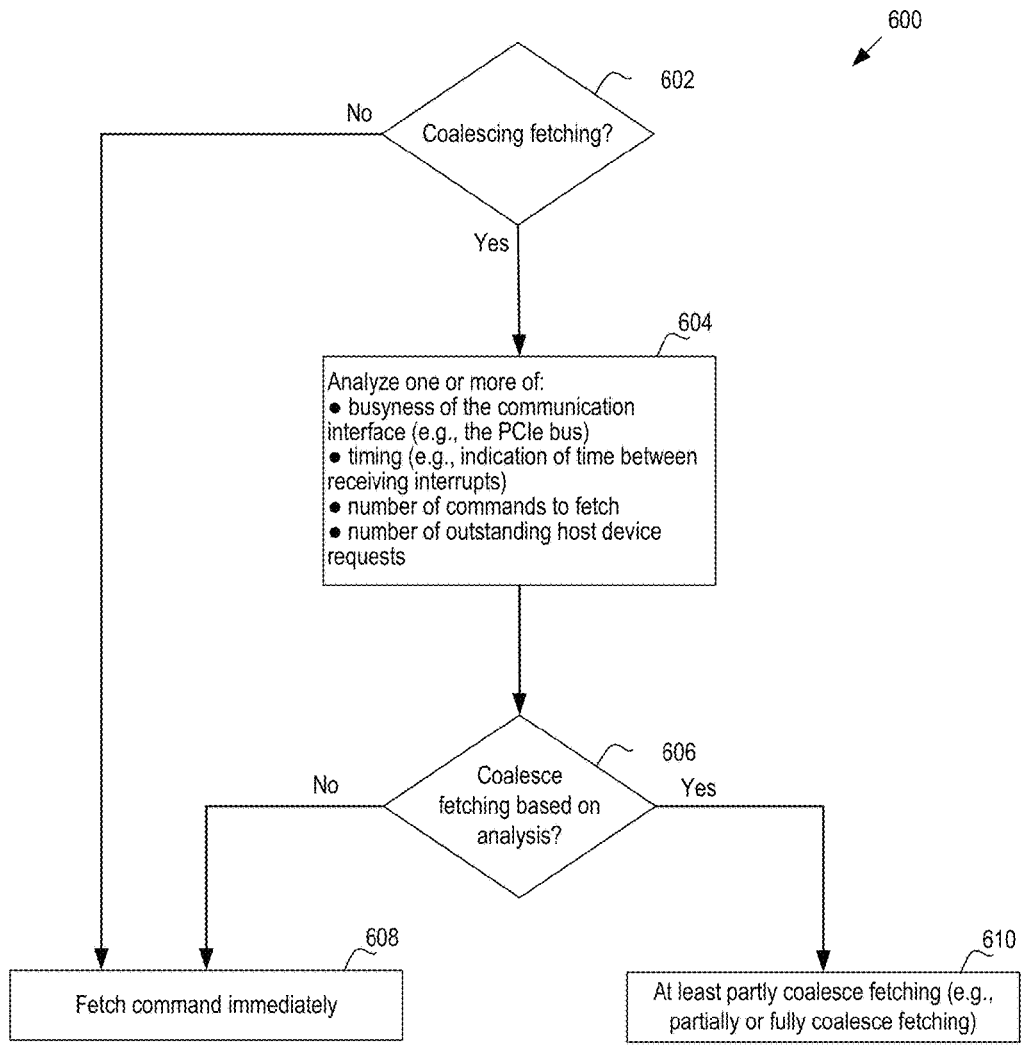
FIG. 6 is a flow chart of a first example method of fetch coalescing.

FIG. 6 is a flow chart 600 of a first example method of fetch coalescing. At 602, the memory device determines whether fetching is coalesced. If not, at 608, the command is fetched immediately upon receipt of the doorbell update. If so, one or more aspects are analyzed, such as: busyness of the communication interface (e.g., the PCIe bus); timing (e.g., indication of time between receiving interrupts); the number of commands to fetch; the number of outstanding host device requests. At 606, the memory device determines whether to coalesce the fetching based on the analysis. If so, at 610, the fetching is at least partly coalesced (e.g., partially or fully coalescing the fetching). If not, at 608, the command is fetched immediately.

Figure 7:
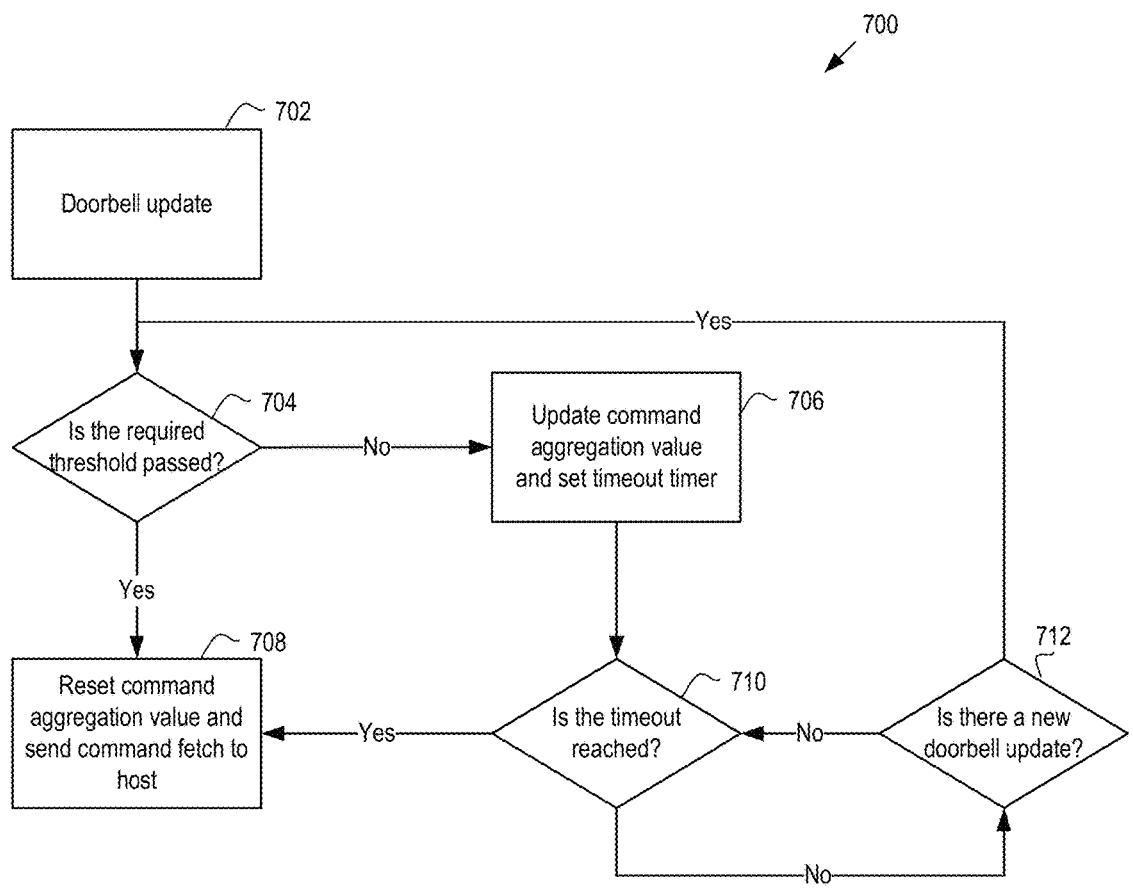
FIG. 7 is a flow chart of a second example method of fetch coalescing.

FIG. 7 is a flow chart 700 of a second example method of fetching coalescing. In one implementation, after each doorbell update, the memory device may compare the number of aggregated commands to the command fetching threshold. At 704, the memory device determines if the command fetching threshold is passed. If so, at 708, the memory device sends the command fetch to the host device. If not, at 706, the memory device updates the command aggregation value and sets the timeout timer. At 710, the memory device determines if the timeout (as determined by the timer) has been reached. If so, flow chart 700 moves to 708 in order for the memory device to send the command fetch to the host device. If not, at 712, the memory device determines if another doorbell update has been received. If so, the flow diagram loops back to 704. If not, the flow diagram 700 loops to 710 to determine if the timeout has occurred.

Figure 8:
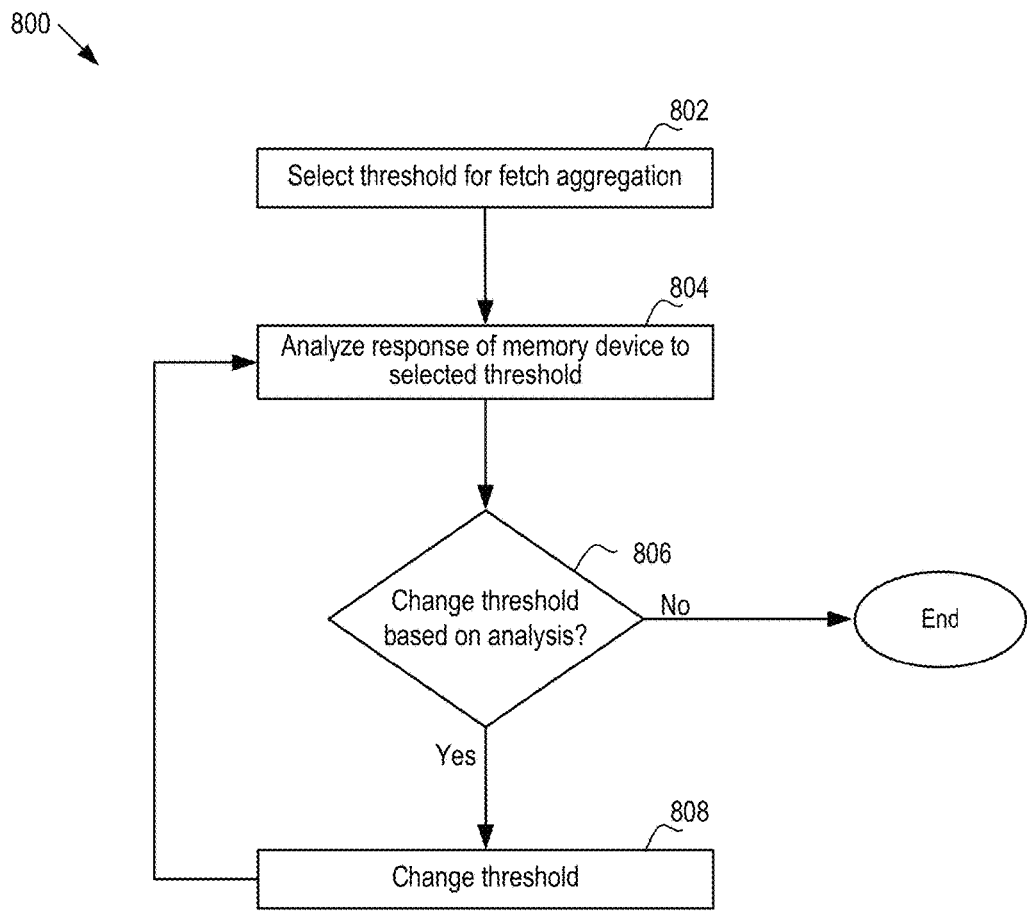
FIG. 8 is a flow chart of an example method of iteratively selecting a threshold for fetch coalescing.

FIG. 8 is a flow chart 800 of an example method of iteratively selecting a threshold for fetch coalescing. At 802, the memory device selects a threshold for fetch aggregation. At 804, the memory device analyzes the response of the memory device to the selected threshold. For example, the memory device may analyze bus busyness in response to the selected threshold. At 806, the memory device may determine, based on the analysis, whether to change the threshold. If so, at 808, the memory device changes the selected threshold, and loops back to 804.

Lastly, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

The invention claimed is:

1. A method comprising:
receiving an indication from a host device of one or more commands available for fetching from at least one submission queue, the host device having caused the one or more commands to be stored on the at least one submission queue for a memory device to process; and
responsive to receiving the indication, the memory device:
accessing a fetching threshold, the fetching threshold indicative of a number of commands or a wait time;
determining whether the fetching threshold is met, wherein determining whether the fetching threshold is met comprises determining whether the one or more commands available for fetching is greater than or equal to the fetching threshold;
in response to determining that the fetching threshold is met, fetching the one or more commands from the at least one submission queue; and
in response to determining that the fetching threshold is not met, waiting to fetch the one or more commands from the at least one submission queue.

2. The method of claim 1, wherein:
the fetching threshold is indicative of a number of commands.

3. The method of claim 1, wherein:
the fetching threshold is indicative of a wait time; and
determining whether the fetching threshold is met comprises determining whether a time since a last fetch for commands is greater than or equal to the fetching threshold.

4. The method of claim 1, further comprising analyzing at least one aspect of a communication interface between the host device and the memory device to dynamically determine the fetching threshold.

5. The method of claim 4, wherein analyzing at least one aspect of the communication interface comprises analyzing a busyness of the communication interface.

6. The method of claim 1, further comprising:
analyzing patterns between different indications from the host device; and
selecting the fetching threshold based on the analysis.

7. The method of claim 1, further comprising:
determining processing capacity of the memory device; and
determining, based on the determined processing capacity, whether to require that a number of commands for fetching be greater than or equal to the fetching threshold before fetching the one or more commands from the at least one submission queue.

8. The method of claim 7, wherein:
in response to determining that the memory device has higher processing capacity, determining not to require that the number of commands for fetching be greater than or equal to the fetching threshold before fetching the one or more commands from the at least one submission queue; and in response to determining that the memory device has lower processing capacity, determining to require that the number of commands for fetching be greater than or equal to the fetching threshold before fetching the one or more commands from the at least one submission queue.

9. The method of claim 1, further comprising dynamically determining, by the memory device, the fetching threshold.

10. The method of claim 9, wherein the memory device dynamically determines the fetching threshold based on an analysis, by the memory device, of a number of commands requested to be fetched in previously received indications from the host device.

11. The method of claim 9, wherein the memory device dynamically determines the fetching threshold based on a number of outstanding host device requests.

12. A non-volatile memory device comprising:
a non-volatile memory;
a communication interface configured to communicate with a host device; and
a controller in communication with the non-volatile memory and the communication interface, the controller configured to:
  prior to receiving an indication from the host device, analyze one or more aspects related to at least one submission queue, the host device having caused commands to be stored on the at least one submission queue for the memory device to process;
  prior to receiving the indication from the host device, determine, based on the analysis of the one or more aspects, one or more fetching criteria, the fetching criteria indicative of when the memory device is to fetch commands from the at least one submission queue;
  receive the indication from the host device of one or more commands available for fetching from the at least one submission queue; and
  responsive to receiving the indication:
    determine whether the one or more fetching criteria has been met;
    in response to determining that the one or more fetching criteria has been met, fetch the one or more commands from the at least one submission queue; and
    in response to determining that the one or more fetching criteria has not been met, wait to fetch the one or more commands from the at least one submission queue.

13. The memory device of claim 12, wherein:
the controller is configured to analyze the one or more aspects related to the at least one submission queue by analyzing patterns between different indications from the host device;
the one or more fetching criteria comprises a wait time; and
in response to receiving the indication, the controller is configured to wait, based on the wait time, before fetching the one or more commands from the at least one submission queue.

14. The memory device of claim 12, wherein:
the controller is configured to analyze the one or more aspects related to the at least one submission queue by analyzing busyness of a bus between the host device and the memory device;
and the one or more fetching criteria is based on the busyness of the bus.

15. The memory device of claim 12, wherein:
the controller is configured to analyze the one or more aspects related to the at least one submission queue by determining a number of commands from the at least one submission queue currently being processed by the memory device; and
the one or more fetching criteria is based on the number of commands from the at least one submission queue currently being processed by the memory device.

16. The memory device of claim 12, wherein the controller is configured to analyze at least one aspect of the host device to determine the one or more fetching criteria.

17. The memory device of claim 12, wherein the controller is configured to:
in response to receiving the indication from the host device, analyze the one or more aspects and determine the one or more fetching criteria.

18. A non-volatile memory device comprising:
means for receiving an indication from a host device of one or more commands available for fetching from at least one submission queue, the host device having caused the one or more commands to be stored on the at least one submission queue for the memory device to process; and
responsive to receiving the indication:
  means for accessing a fetching threshold, the fetching threshold indicative of a number of commands or a wait time;
  means for determining whether the fetching threshold is met, wherein the means for determining whether the fetching threshold is met comprises means for determining whether the one or more commands available for fetching is greater than or equal to the fetching threshold;
  in response to determining that the fetching threshold is met, means for fetching the one or more commands from the at least one submission queue; and
  in response to determining that the number of commands for fetching is greater than or equal to a fetching threshold, means for waiting to fetch the one or more commands from the at least one submission queue.

19. The memory device of claim 18, wherein:
the fetching threshold is indicative of a number of commands.

20. The memory device of claim 18, wherein:
the fetching threshold is indicative of a wait time; and
the means for determining whether the fetching threshold is met comprises means for determining whether a time since a last fetch for commands is greater than or equal to the fetching threshold.

* * * * *